May 13, 1969   I. S. GOODMAN   3,444,348
HERMETIC SEALING OF REFRACTORY METAL TUBING
Filed Aug. 12, 1966

WITNESSES
Theodore F. Wrobel
James F. Young

INVENTOR
Isaac S. Goodman
BY
Blair R. Studebaker
ATTORNEY

United States Patent Office 3,444,348
Patented May 13, 1969

3,444,348
HERMETIC SEALING OF REFRACTORY METAL TUBING
Isaac S. Goodman, Livingston, N.J., assignor to Westinghouse Electric Corporation, Pittsburgh, Pa., a corporation of Pennsylvania
Filed Aug. 12, 1966, Ser. No. 572,057
Int. Cl. B23k *11/02*
U.S. Cl. 219—117                 6 Claims

ABSTRACT OF THE DISCLOSURE

A method for the tip-off welding of refractory metal tubing, in air, to produce a vacuum tight seal which comprises the steps of; inserting a length of oxidation resistant metal or metal alloy tubing within the refractory metal tube, pinching off or squeezing the tube in the area overlying the oxidation-resistant metal or alloy and resistance tip-off welding the tube to provide a vacuum tight hermetic seal.

---

This invention relates to hermetic sealing of tubular members and more particularly to the production of hermetic seals for refractory metal tubulations by resistance welding.

Attempts to hermetically seal refractory metal tubing by the resistance welding process have not heretofore proved entirely successful. A number of difficulties have been encountered. One such difficulty is due to the extremely high temperatures which are required to resistance weld refractory metals, such as niobium, tantalum, molybdenum and tungsten. For example, even with niobium, which has a melting point of 2500° C., the lowest melting point of the four, the electrodes used in resistance tip-off welding are extremely short lived. This short life is due to both the uncommonly high temperatures required and the fact that the refractory metals tend to stick to the electrode surfaces at these high temperatures. Another problem with the resistance tip-off welding of refractory metal tubing is that under the high temperature conditions the interior surface of the tubing in the area of the weld is oxidized. This oxidation in many instances apparently renders the seal non-hermetic and hence the utility of the weld is negated.

The ability to tip-off weld refractory metal tubulation to provide a hermetic seal is extremely important, for example, in the production of high-temperature, ceramic-bodied, metallic-vapor lamps. Furthermore, from a production standpoint, the ability to provide tip-off welded hermetic seals without employing an inert atmosphere during the welding process is highly desirable.

It is accordingly an object of the present invention to provide a hermetically sealed, tip-off weld in a refractory metal tube.

Another object of the present invention is to provide a method for producing hermetic seals in refractory metal tubing.

A further object of this invention is to provide a method for producing hermetic seals in refractory metal tubing at significantly lower welding temperatures.

A still further object is the production of a hermetic seal in refractory tubing by tip-off welding in air.

Yet another object of the present invention is to eliminate the internal oxidation in tip-off welds of refractory metal tubing.

These and other objects are accomplished in accordance with the present invention in the tip-off welding, in air, of refractory metal tubing to produce a vacuum-tight seal by inserting an oxidation-resistant metal or metal alloy within the refractory metal tube, pinching off or squeezing the tube in the area overlying the oxidation-resistant metal or alloy and resistance tip-off welding the tube to provide a vacuum-tight hermetic seal. The seal formed by this process essentially, in cross-section, appears as a flattened ellipse of refractory metal having an oxidation-free interior surface and a central cavity completely filled with oxidation-resistant metal in welded relationship to the entire interior surface of the welded portion of the refractory metal tubing.

The foregoing objects, as well as many of the attendant advantages of the present invention, will become better understood and more readily appreciated as the following detailed description is considered in connection with the accompanying drawing in which.

Two of the principal problems encountered in the tip-off welding of refractory metal tubing are the internal oxidation of the tubing and the extremely high melting point of the refractory metals which consequently requires extremely high heat input to resistance weld the tubing. It has been found that by inserting a thin-walled oxidation resistant metallic body, preferably in the form of a sleeve, of for example nickel or a nickel alloy, within the refractory metal tubing that, during welding, the metallic sleeve will exert a wetting action on the interior surface of the tubing dissolving any oxides which may form. Furthermore, the thermal heat input required to effect a vacuum-tight weld is approximately one-half that which is required to effect a tip-off weld of the refractory metal tube alone. This is due primarily to the fact that nickel and its alloys melt at between 1100 and 1500° C. whereas the refractory metals referred to above have melting points in excess of 2500° C. Some examples of suitable nickel alloys are Monel metal, Nichrome and Hastelloy (Handbook of Chemistry and Physics, Twenty-fourth Edition).

Figure 1:
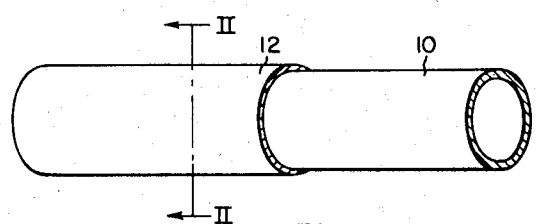
FIGURE 1 is a partial perspective view of the refractory metal tubing with an oxidation-resistant metallic sleeve inserted therein.
Figure 2:
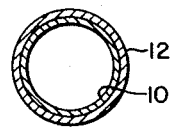
FIG. 2 is a sectional view taken along the line II—II of FIG. 1.

FIGURES 1 through 4 of the drawing illustrate the method by which the present invention is practiced. As illustrated in FIG. 1 an oxidation resistant metallic member 10 in the form of a sleeve is inserted into the refractory metal tubulation 12. The outside diameter of the metallic sleeve 10 should be only slightly less than the internal diameter of the refractory metal tube. If the metallic member 10 is other than circular in cross-section the peripheral area thereof should be only slightly less than the internal area of that portion of the tubulation which surrounds it. This is necessary to insure the wetting of the entire inner surface of the tube by the oxidation resistant metal during welding.

As a specific example, in the production of high-temperature, ceramic-body, metallic-vapor lamps the tubulation employed to both evacuate the lamp and to insert the discharge sustaining filling is, in many instances, a one-eighth inch diameter niobium tube having a wall thickness of approximately 15 mils. Into this niobium tube is inserted a nickel sleeve having a wall thickness of from about 2 to 4 mils and an outside diameter such that a slide fit is effected within the niobium tubulation. The wall thickness of the oxidation resistant metallic sleeve should in no case be greater than the wall thickness of the refractory metal tubing and is preferably of a thickness of about one-fourth the thickness of the refractory metal tubing.

Figure 3:
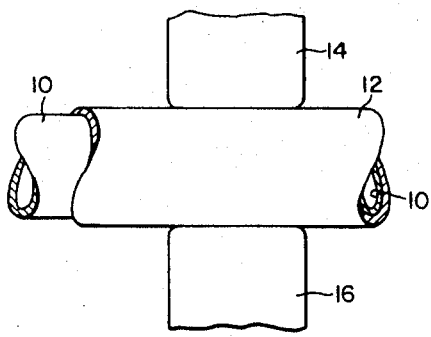
FIG. 3 is a schematic view of the refractory metal tube and oxidation-resistant sleeve just prior to welding.
Figure 4:
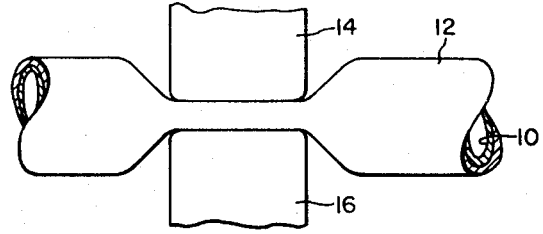
FIG. 4 is a schematic view of the refractory metal tube after squeezing between a pair of welding jaws.

As shown in FIG. 3, a pair of resistance welding jaws 14 and 16 are brought to bear on the surface of the refractory metal tubing 12 overlying the sleeve 10. The tubulation 12 is then squeezed, crushed or pinched off by the welding jaws 14, 16 (FIG. 4) and the tubulation resistance welded in the conventional manner of accurate short welding equipment. Effective tip-off welding in accordance with the present invention should be accomplished with a welding cycle or duration of from about one-tenth to one-sixtieth of a second with a welding time of about one-twelfth of a second being preferred.

Figure 5:
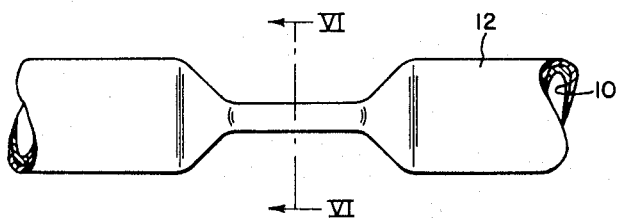
FIG. 5 is a perspective view of the refractory metal tube after tip-off welding.
Figure 6:
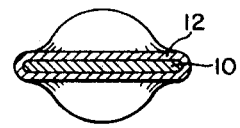
FIG. 6 is a sectional view taken along the line VI—VI of FIG. 5.

FIGS. 5 and 6 illustrate a refractory metal tube after it has been hermetically sealed in accordance with the present invention. As can be seen in FIG. 6, the refractory metal tubulation 12 in the area of the weld is in the form of a flattened ellipse with the entire area defined by the internal surface of said refractory metal being filled with the oxidation-resistant metal 10 which has been melted to form the hermetically sealed weld which gives a sandwich-like appearance in cross-section.

As can be seen from the foregoing, the resistance tip-off welding method of the present invention provides hermetic seals in refractory metal tubing which are both vacuum-tight and consistently reproducible, they can be effected at substantially lower welding temperatures and hence permit the accomplishment of an increased number of welds without requiring the cleaning or replacing of welding electrodes.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

I claim as my invention:

1. The method of sealing off a refractory metal hollow member in air comprising the steps of:
    (a) inserting into the refractory metal hollow member an oxidation-resistant metallic member having a peripheral area which is only slightly less than the internal area of that portion of the refractory metal hollow member which surrounds it;
    (b) bringing a pair of resistance welding jaws to bear on the surface of said hollow member overlying said inserted member; and
    (c) squeezing and resistance tip-off welding said hollow member to provide a vacuum-tight seal therein.

2. The method according to claim 1 wherein said refractory metal is niobium and has a tubular configuration.

3. The method according to claim 1 wherein said metallic member principally comprises nickel.

4. The method according to claim 1 wherein said refractory metal is niobium and said metallic member principally comprises nickel.

5. The method according to claim 1 wherein said metallic member is a sleeve and the outside diameter of said sleeve and the inside diameter of said refractory metal hollow member bear such relationship as to provide a slide fit.

6. A method of tip-off welding in air a refractory metal tube to produce a vacuum-tight seal comprising the steps of:
    (a) positioning an oxidation-resistant metallic sleeve within said tube, said metallic sleeve having an outside diameter slightly less than the inside diameter of said tube;
    (b) positioning a pair of resistance welding jaws on opposite sides of the surface of said tube proximate said sleeve; and
    (c) squeezing said tube and said sleeve within said jaws while passing sufficient current between said jaws to provide a vacuum-tight weld in said tube.

References Cited

UNITED STATES PATENTS 2,057,969  10/1936  Payson et al. _____ 219—117
2,508,466   5/1950  Brace et al. _____ 29—494

RICHARD M. WOOD, *Primary Examiner.*

P. W. MAY, *Assistant Examiner.*

U.S. Cl. X.R.

219—118